United States Patent
Worley

[15] 3,698,763
[45] Oct. 17, 1972

[54] BICYCLE SADDLE
[72] Inventor: George W. Worley, Bolivar, Tenn.
[73] Assignee: Troxel Manufacturing Company, Moscow, Tenn.
[22] Filed: Oct. 26, 1970
[21] Appl. No.: 83,903

[52] U.S. Cl..................................297/214, 297/208
[51] Int. Cl..............................................B62j 1/18
[58] Field of Search......297/196, 198, 203, 208, 209, 297/212, 214, 215

[56] References Cited

UNITED STATES PATENTS

| | | | |
|---|---|---|---|
| 448,739 | 3/1891 | Edwards | 297/198 |
| 1,373,718 | 4/1921 | Evans | 297/203 |
| 1,577,340 | 3/1926 | Mesinger | 297/198 |
| 3,604,748 | 9/1971 | Lamkemeyer | 297/214 |

FOREIGN PATENTS OR APPLICATIONS

| | | | |
|---|---|---|---|
| 320,168 | 10/1929 | Great Britain | 297/209 |
| 240,978 | 10/1925 | Great Britain | 297/209 |

Primary Examiner—Bobby R. Gay
Assistant Examiner—Darrell Marquette
Attorney—John R. Walker, III

[57] ABSTRACT

A saddle intended to be mounted on a single saddle post of a bicycle. The saddle includes a horizontally extending lower truss having usual structure for attaching the truss to the post of the bicycle, and an upper frame assembly supporting a resilient cover. The frame assembly is pivotally attached forwardly and resiliently attached rearwardly thereof to the lower truss and includes interposed leaf springs which act in conjunction with the resiliency of the cover to cushion the rider, i.e., the leaf springs contiguously engage the underneath surface of the cover, and the weight of the rider flexes both the leaf springs and the cover intermediate the length thereof.

6 Claims, 6 Drawing Figures

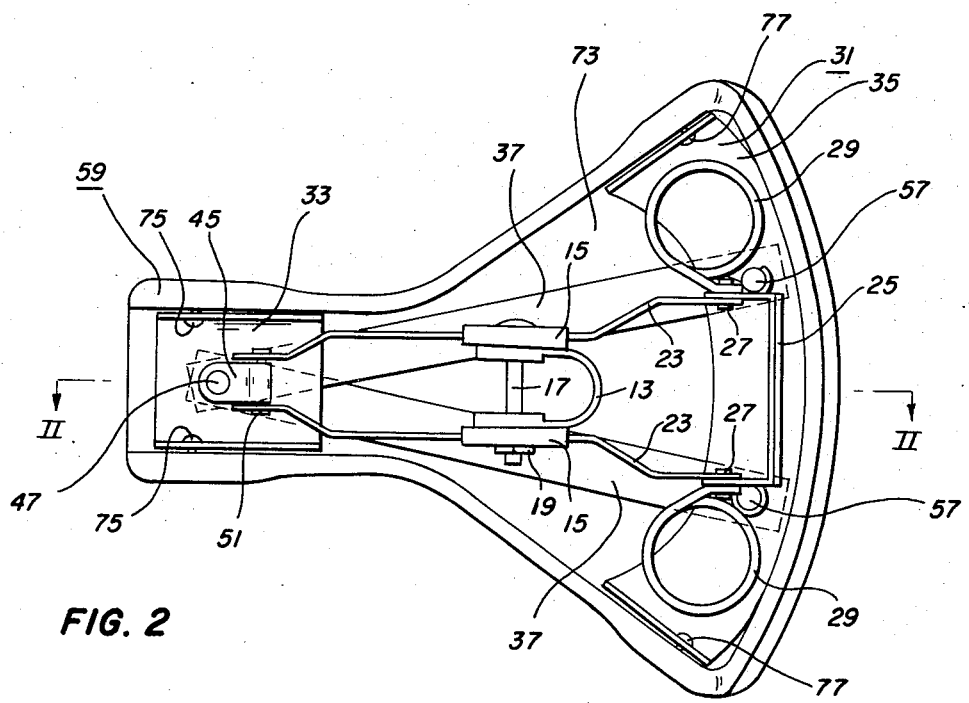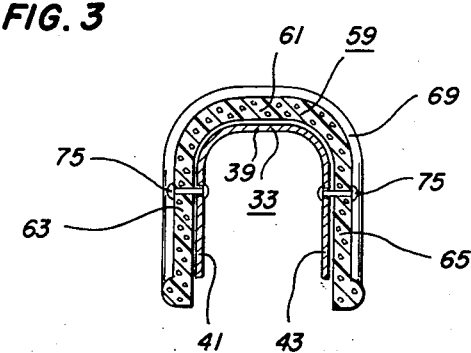

INVENTOR.
GEORGE W. WORLEY
BY John R. Walker, III
Attorney

BICYCLE SADDLE

BACKGROUND OF THE INVENTION

1. Field of the Invention

This invention pertains to the field of bicycle saddles.

2. Description of the Prior Art

The prior art known by the applicant includes: the Edwards U.S. Pat. No. 448,739; the Hall U.S. Pat. No. 583,433; the Beyer U.S. Pat. No. 585,177; the Kraeft U.S. Pat. No. 2,068,125; the McWhorter et al. U.S. Pat. No. 2,303,567; the Kalter U.S. Pat. No. 2,316,436; the Schwinn U.S. Pat. No. 2,476,226; the Von Szilagyi U.S. Pat. No. 2,639,760; and the Mesinger U.S. Pat. No. 3,416,838.

The U.S. Pat. No. 448,739 pertains to a unique velocipede saddle provided with adjustable spring structure for adjustably compensating for the variance in weights of different riders, etc.

The U.S. Pat. No. 583,433 incorporates numerous flat springs and companion plate springs interconnected so as to form a compound arrangement of the series of springs entering into the structure providing a unique saddle of the required firmness and at the same time having a springy and yielding nature.

The U.S. Pat. No. 585,177 utilizes a plurality of rods forming the springs which are loosely connected with the saddle. The springs diverge rearwardly and by this construction the saddle will be self-adjusting and in operation will have a pleasant rocking motion, both laterally and longitudinally, corresponding with the motion of the rider, thus avoiding the usual rigidity of prior saddles.

The U.S. Pat. No. 2,068,125 pertains to a juvenile vehicle having a typical saddle thereon. The U.S. Pat. No. 2,303,567 pertains to unique forward resilient seat mounting structure. The U.S. Pat. No. 2,316,436 is directed toward an improved structure for securing a saddle to the saddle post, the saddle being of usual construction. The U.S. Pat. No. 2,476,226 is directed toward mounting a typical saddle and more particularly toward mountings for saddles having their resilient suspension at the front end of the seat. The U.S. Pat. No. 2,639,760 is directed toward an adjustable resilient shock absorbing support for typical saddles and particularly to a shock absorbing support device which may be mounted by the conventional securing means in the usual general upright tubular frame member of the vehicle frame so as to resiliently support the saddle. Also, it is provided with means readily accessible from the exterior of the support and frame member by which the device can be easily adjusted manually in relation to the weight of the rider of the vehicle so as to absorb vibrations regardless of the weight of the rider and the condition of the road.

None of the above patents includes structure which utilizes the cover or skin of the frame so that it contributes strength to the whole of the saddle, i.e., the cover being a working member in addition to covering the frame. However, the U.S. Pat. No. 3,416,838 teaches the art of utilizing certain materials in assembling a cover whose parts include a shell whereby the thickness thereof and its resilient stiffness is selected to cooperate with the tension members of the frame to provide adequate vertical resilience but stiff enough to prevent excessive sagging of the top in the central seating areas. The U.S. Pat. No. 3,416,838 appears to be directed toward providing a saddle underframe construction wherein the stiffness of the seating surface support can be readily preselected without changing any parts by mere adjustment of a single part, etc.

SUMMARY OF THE INVENTION

The concept of the present invention is to provide a bicycle saddle intended to be mounted on the single saddle post of a bicycle, the portion intermediate the fore and aft ends thereof being resiliently displaceable vertically so as to provide a greater degree of cushioning to the rider, i.e., the weight of the rider displaces the resilient midsection of the saddle, thus absorbing more of the shock developed when the bicycle passes over a bumpy road.

The saddle includes a horizontally extending lower truss having the usual structure for attachment to the post of the bicycle, and an upper frame assembly supporting a resilient cover. The frame assembly is pivotally attached forwardly and resiliently attached rearwardly thereof to the lower truss and includes a plurality of leaf springs interposed between a fore and aft member. The leaf springs act in conjunction with the resiliency of the cover to cushion the rider, i.e., the leaf springs contiguously engage the underneath surface of the cover, and the weight of the rider flexes both the leaf springs and the midportion of the cover simultaneously.

DESCRIPTION OF THE DRAWINGS

FIG. 1 is a bottom view of the saddle of the present invention.

FIG. 2 is a sectional view taken as on the line II—II of FIG. 1.

FIG. 3 is a sectional view taken as on the line III—III of FIG. 2.

DESCRIPTION OF THE PREFERRED EMBODIMENT

Figure 4:
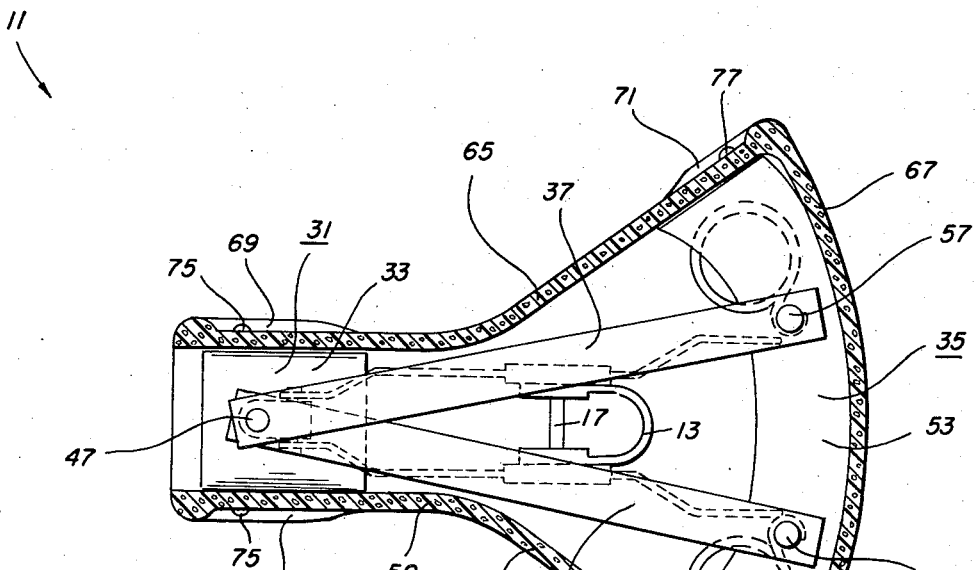
FIG. 4 is a sectional view taken as on the line IV—IV of FIG. 2.

The bicycle saddle 11 of the present invention is intended to be used with any bicycle that provides the well known single post saddle support (not shown), i. e., the saddle 11 having the usual U-shaped member 13 for circumferentially engaging the post and the two channel members 15, arranged so that one of the sides thereof frictionally engages the U-shaped member 13 and the outwardly directed channel portions thereof engage rigid structure of the saddle 11. A bolt 17, extending through suitable apertures in the U-shaped member 13, the channel members 15 and the rigid structure of the saddle 11, is suitably compressed by a nut 19 so as to bindingly close the U-shaped member 13 about the post, structure obvious to those skilled in the art.

The saddle 11 includes a horizontally extending lower truss 21, i. e., the truss 21 being a standard spring truss having a pair of horizontal members 23 extending substantially the length of the saddle 11 having a shape substantially as depicted in FIGS. 1 and 2 of the drawings, and a transverse member 25 interconnecting the two horizontal members 23 adjacent the rearward ends thereof by a pair of rivets 27. A pair of vertically disposed convolutely wound compression springs 29 have the lower ends thereof respectively fixedly attached to the horizontal members 23 in any well known manner, e. g., by the aforementioned rivets 27. Obviously, the horizontal members 23 are provided with suitably aligned apertures for receiving the bolt 17, i. e., the members 23 being the "rigid structure" alluded to previously in the disclosure.

The saddle 11 includes an upper frame assembly 31 having a cap member 33, a rearward base member 35, and a plurality of leaf-like resilient springs 37 interposed between and interconnecting the cap member 33 with the base member 35, as best viewed in FIGS. 1 and 2. The cap member 33, preferably formed from an elliptical shaped piece of sheet steel or the like, is folded transversely thereof so as to form a horizontal portion 39, a left vertical portion 41, and a right vertical portion 43, as best viewed in FIGS. 2 and 3.

The cap member 33 is pivotally attached adjacent the forward end of the lower truss 21 in the following manner: A hinge member 45 is fixedly attached to the cap member 33, i. e., the hinge member 45 and the horizontal portion 39 of the cap member 33 are provided with suitable apertures for receiving a securing means, e. g., a rivet 47. The hinge member 45 extends rearwardly from the rivet 47 terminating a distance therefrom with a transverse aperture 49 for receiving a pivot pin 51. The upper end of the horizontal members 23 is provided with suitable apertures which also receive the pivot pin 51 so that the cap member 33 may be free to pivot about the horizontal pivot pin 51.

Figure 5:
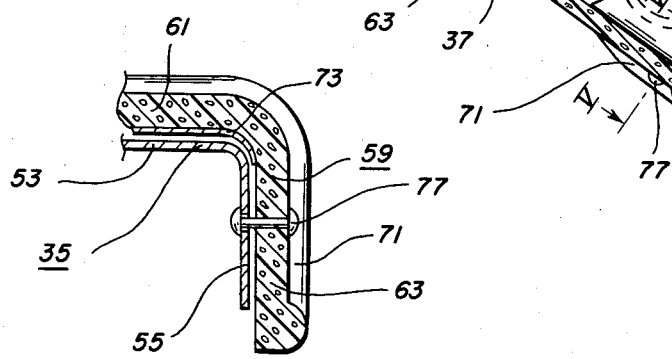
FIG. 5 is an enlarged sectional view taken as on the line V—V of FIG. 4.

From FIGS. 4 and 5 of the drawings, it may be seen that the base member 35, preferably formed from a piece of sheet steel having a shape substantially like the capital letter C, includes a major horizontal portion 53 and two downturned flanges 55, i. e., the flanges 55 defining the ends of the base member 35. It should be understood that FIG. 5 conveniently depicts the left downturned flange 55, however, the downturned flange 55 defining the opposite end of the base member 35 and the adjacent structure are substantially identical to the structure depicted in FIG. 5.

Figure 6:
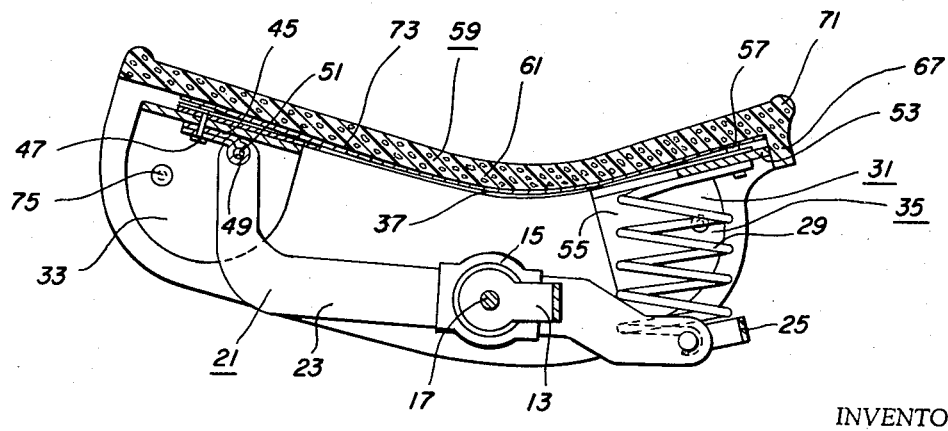
FIG. 6 is a view similar to FIG. 2 showing the flexible displacement of the midsection of the saddle of the present invention.

From FIGS. 2 and 6 of the drawings, it may be seen that the base member 35 is resiliently attached to the truss 21 by the compression springs 29, i. e., the major horizontal portion 53 of the base member 35 is provided with suitably aligned apertures for receiving securing means, e. g., a pair of rivets 57. In other words, the rivets 57 fixedly attach the upper ends of the springs 29 to the horizontal portion 53 of the base member 35.

The pair of leaf-like springs 37, preferably formed from relatively thin spring steel being symmetrically arranged one with the other and with the planes thereof being horizontally disposed, have one of the ends thereof respectively fixedly attached to the horizontal portion 53 and converge forwardly therefrom, and the other ends thereof fixedly attached to the horizontal portion 39 of the cap member 33. In other words, the rearward ends of the springs 37 are provided with suitable apertures adjacent the ends thereof for receiving the aforementioned rivets 57 and the forward ends thereof overlappingly engage one another and are provided with suitable apertures adjacent the forward ends thereof for receiving the aforementioned rivet 47.

From FIG. 2 of the drawings, it may be seen that the leaf springs 37 preferably lie in a horizontal plane when in a relaxed position. From FIG. 6 of the drawings, it may be seen that the leaf springs 37 are yieldably displaced, i. e., from the weight of the rider, vertically as the hinge member 45 pivots about the pivot pin 51. In other words, the hinge member 45, the cap member 33, and the forward ends of the springs 37 are fixedly attached one to the other by the aforementioned rivet 47. It should also be obvious when comparing the springs 29 in FIG. 6 of the drawings with the springs 29 in FIG. 2 of the drawings that the weight of the rider also compresses the springs 29, In other words, most of the weight of the rider is supported by the springs 29 while the leaf springs 37 provide the rider with a softer more cushioning effect as the bicycle travels over a bumpy road.

The saddle 11 includes a resilient cover 59 formed from any of the well known resilient materials, e. g., molded rubber, self-skinning type polyurethane foam, or ejection molded or slush molded vinyls, etc. The cover 59 has a planar fan-shaped horizontal portion 61, respective left and right downturned side portions 63, 65, and a rearward downturned portion 67. The cover 59 additionally includes respective forward and rearward welt-like ridges 69, 71, i. e., the forward ridge 69 extending from a point beginning adjacent the lower edge of the left side portion 63 extending upwardly across the horizontal portion 61, thence downwardly along the right side portion 65 terminating at a point adjacent the lower edge thereof. The rearward ridge 71 extends from a point beginning adjacent the lower edge of the left side portion 63 extending upwardly to and across the horizontal portion 61, thence downwardly along the right side portion 65 terminating at a point adjacent the lower edge thereof.

The saddle 11 additionally includes a liner 73, having a fan-like shape and formed from any of the well known tough skin sheet materials, e. g., fiber-reinforced sheet rubber or the like. The liner 73, being interposed between the upper frame assembly 31 and the cover 59, is arranged so that the fan-like shape thereof is suitably aligned with the fan-like shape of the horizontal portion 61 and is placed within the interior of the cover 59 so that the toughest surface thereof contiguously engages the frame assembly 31. The cover 59 inherently possesses excellent cut-resistant characteristics which, in essenqe, obviates the necessity for the liner 73. However, I essence, discovered from extensive testing of the saddle 11 that the liner 73 will prolong the usable life thereof. Accordingly, the liner 73, being optional, may be deleted from the saddle 11 of the present invention without departing from the spirit and scope thereof.

The respective left and right side portions 63, 65 of the cover 59 extends from a point adjacent the forwardmost edges of the cap member 33 and extends rearwardly, terminating at respective points adjacent the rearwardmost edges of the downturned flanges 55, i. e., the inner surfaces of the respective left and right side portions 63, 65 contiguously engage the left and right vertical portions 41, 43 of the cap member 33 and the flanges 55.

The saddle 11 of the present invention includes a front pair of rivets 75, i. e., the respective rivets 75 being pivotally received in suitably sized and aligned apertures in the left and right portions 41, 43 of the cap member 33 and the left and right side portions 63, 65 of the cover 59, as best viewed in FIG. 3.

The saddle 11 additionally includes a rearward pair of rivets 77, i. e., the respective rivets 77 being received by suitably sized and aligned apertures in the flanges 55 and the left and right side portions 63, 65 of the cover 59, as best viewed in FIGS. 1, 4 and 5. It should be understood that the respective font and rear pairs of rivets 75, 77 are not rigidly clinched to their adjacent structure, i. e., the forward end of the cover 59 is free to shift or rotate slightly with respect to the cap member 33 about the longitudinal axes of the rivets 75. Additionally, the rearward end of the cover 59 is free to shift or rotate slightly with respect to the downturned flanges 55 about the longitudinal axes of the rivets 77.

The cover 59, being resilient, assumes a horizontal position substantially as depicted in FIG. 2 when unrestrained. The weight of the rider upon the saddle 11 displaces the horizontal portion 61 of the cover 59 substantially as viewed in FIG. 6 of the drawings. In other words, the cover 59 must be of a resilient characteristic and of sufficient thickness so that it contributes strength to the structure of the saddle 11, i. e., it is a working member thereof plus being a cushioning surface to comfortably support the rider.

The weight of the rider upon the saddle 11 compresses the springs 29, flexes the leaf spring 37 and the co-functioning resilient cover 59 intermediate the length thereof, pivots the cap member 33 about the pivot pin 51, and pivots the resilient cover 59 relative to the cap member 33 and the rearward base member 35 about the rivets 75, 77 for cushioning the rider by absorbing the shock developed when the bicycle passes over a bumpy road. Also, the rearwardly diverging leaf springs 37 extending beneath both sides of horizontal portion 61 provide a spring support which helps to maintain the rider's balance and which gives stability to the saddle. In addition, it should be pointed out that the thickness of the spongelike cover enhances the cushioning qualities of the saddle 11.

Although the invention has been described and illustrated with respect to a preferred embodiment thereof, it is not to be so limited since changes and modifications may be made therein which are within the full intended scope of the invention.

I claim:

1. A bicycle saddle comprising horizontally extending lower truss means; upper frame means including a forward cap member, a rearward base member, and leaf-like resilient means interconnecting said cap member and said base member; means pivotally attaching said cap member to said truss means, means resiliently attaching said rearward base member to said truss means, resilient cover means, means attaching said cover means forwardly thereof to said cap member and rearwardly thereof to said base member, said leaf-like resilient means including a plurality of leaf-like members symmetrically arranged and with the planes thereof being horizontally disposed having one of the ends thereof respectively fixedly attached to said rearward base member and converging forwardly therefrom and the other ends thereof fixedly attached to said cap member so as to contiguously engage the underneath surface of said resilient cover means for coacting therewith to cushion the rider.

2. A bicycle saddle comprising horizontally extending lower truss means; upper frame means including a forward cap member, a rearward base member, and leaf-like resilient means interconnecting said cap member and said base member; means pivotally attaching said cap member to said truss means, means resiliently attaching said rearward base member to said truss means, resilient cover means, means attaching said cover means forwardly thereof to said cap member and rearwardly thereof to said base member, said leaf-like resilient means including a plurality of leaf-like members symmetrically arranged and with the planes thereof being horizontally disposed having one of the ends thereof respectively fixedly attached to said rearward base member and converging forwardly therefrom and the other ends thereof fixedly attached to said cap member so as to contiguously engage the underneath surface of said resilient cover means for coacting therewith to cushion the rider; said means attaching said cover means to said cap member and said base member including pivot means pivotally supporting the rearward portion of said cover means from said rearward base member and pivotally supporting the forward portion of said cover means from said cap member allowing said cover means to pivot relative to said base member and said cap member as the weight of the rider flexes said leaf-like resilient means and said coacting resilient cover means intermediate the length thereof.

3. The saddle of claim 1 in which said cover means consists of polyurethane foam plastic.

4. A bicycle saddle comprising horizontally extending lower truss means; upper frame means including a forward arcuate cap member, a rearward horizontal base member, and horizontally disposed leaf-like resilient means interconnecting said cap member and said rearward base member; means pivotally attaching said forward cap member to said truss means, compression spring means resiliently attaching said rearward base member to said truss means, resilient cover means, said base member extending transversely adjacent the rearward portion of the saddle and having downturned flanges defining the ends thereof, means pivotally supporting the rearward portion of said cover means from said downturned flanges, and means pivotally supporting the forward portion of said cover means from said cap member, whereby the weight of the rider upon the saddle compresses said compression spring means, flexes said leaf-like resilient means and said cover means intermediate the length thereof, pivots said pivot means attaching said forward cap member to said truss means, and pivots said cover means relative to said forward cap member and said rearward base member for cushioning the rider by absorbing the shock developed when the bicycle passes over a bumpy road.

5. The saddle of claim 4 in which said horizontally disposed leaf-like resilient means includes a plurality of leaf-like members symmetrically arranged and with the planes thereof being horizontally disposed having one of the ends thereof respectively fixedly attached to said rearward base member and converging forwardly therefrom and the other ends thereof fixedly attached to said cap member so as to contiguously engage the underneath surface of said resilient cover means for coacting therewith to cushion the rider.

6. The saddle of claim 4 in which said leaf-like resilient means includes a pair of leaf-like members having overlapping forward ends fixedly attached to said cap member and diverging rearwardly in a V-shaped arrangement to points of attachment to said rearward base member.

* * * * *